United States Patent [19]

Montgomery

[11] Patent Number: 5,100,845

[45] Date of Patent: Mar. 31, 1992

[54] PROCESS FOR PRODUCING TITANIUM DIBORIDE AND BORON NITRIDE POWDERS

[75] Inventor: Lionel C. Montgomery, Bay Village, Ohio

[73] Assignee: Union Carbide Coatings Service Technology Corporation, Danbury, Conn.

[21] Appl. No.: 669,009

[22] Filed: Mar. 31, 1991

[51] Int. Cl.$^5$ .................. C04B 35/38; C24D 3/02; C01B 21/064; C01B 35/04
[52] U.S. Cl. ........................ 501/96; 51/307; 264/60; 423/290; 423/297
[58] Field of Search ............ 423/289, 290, 297; 501/96, 98; 51/307; 264/65, 66, 60

[56] References Cited

U.S. PATENT DOCUMENTS

| | | | |
|---|---|---|---|
| 4,097,567 | 6/1978 | Cebulak et al. | 501/98 |
| 4,132,554 | 1/1979 | Saito et al. | 501/96 |
| 4,514,355 | 4/1985 | Montgomery | 264/332 |
| 4,693,989 | 9/1987 | Sawe | 501/87 |
| 4,795,723 | 1/1989 | Nishikawa et al. | 264/65 |

OTHER PUBLICATIONS

Figure containing known process to produce titanium diboride and boron nitride powders.

Primary Examiner—Gary P. Straub
Attorney, Agent, or Firm—Cornelius F. O'Brien

[57] ABSTRACT

A process for the simultaneous production of titanium diboride and boron nitride powders using a single reaction procedure in which the raw materials of the TiB$_2$ reaction and the BN reaction are blended together and subjected to a synthesis process which yields synthesized TiB$_2$ and BN powders.

14 Claims, No Drawings

PROCESS FOR PRODUCING TITANIUM DIBORIDE AND BORON NITRIDE POWDERS

FIELD OF THE INVENTION

The invention relates to a process for the production of titanium diboride ($TiB_2$) and boron nitride (BN) powders in essentially a single reaction procedure. The powders so produced can then be hot-pressed to form desired shapes using conventional manufacturing techniques.

BACKGROUND OF THE INVENTION

Conventionally, titanium diboride-boron nitride pellets or billets are produced by hot pressing a blend of titanium diboride and boron nitride powders in a desired ratio under suitable high temperatures and pressures. Receptacles, or as they are commonly referred to as vaporization boats, are machined from these billets to end users' specifications and then employed by the end users as resistant heat sources and containers for vacuum metallizing metals, such as aluminum. The two powders, titanium diboride and boron nitride are generally prepared by separate processes and then mixed and hot pressed into billets. Titanium diboride powder has been prepared in a continuous furnace by the carbon reduction of $TiO_2$ and $B_2O_3$, and boron nitride powder has been produced by a batch process by reacting melamine and $B_2O_3$. The separately produced BN and $TiB_2$ powders are then blended together, prepressed and then hot-pressed using conventional techniques.

An object of the present invention is to provide a process for producing titanium diboride and boron nitride powder using a single process procedure.

It is another object of the present invention to produce titanium diboride and boron nitride powder from a mixture of raw materials used to produce BN and $TiB_2$.

It is another object of the present invention to provide a process for simultaneously producing BN and $TiB_2$ powders that is cost effective and time efficient.

It is another object of the present invention to hot-press synthesized powder of BN and $TiB_2$ obtained from a single process to produce billets which can be machined to a user's specifications to yield resistant heat sources and receptacles for vacuum metallizing metals, such as aluminum.

The above and further objects and advantages of this invention will become apparent upon consideration of the following detailed description thereof.

SUMMARY OF THE INVENTION

The invention relates to a process for the simultaneous production of titanium diboride powder and boron nitride powder comprising the steps:

a) mixing together a titanium-containing compound, a boron-containing compound and particulate carbon in a substantial stoichiometric amount to produce titanium diboride powder along with a nitrogen-containing compound and a boron-containing compound in a substantial stoichiometric amount to produce boron nitride;

b) heating the mixture of step a) to an elevated temperature and time period to produce a synthesized titanium diboride and boron nitride powder;

c) washing the synthesized titanium diboride and boron nitride powder of step b) in an acid or alcohol solution followed by filtering to remove any excess oxides and then drying the residue; and d) pulverizing the residue of step c) to produce titanium diboride powder and boron nitride powder.

The synthesized powder could then be hot-pressed into billets which could then be machined using conventional techniques to yield resistant heat sources and receptacles for vacuum metallizing metals, such as aluminum.

Examples of raw materials suitable for producing the titanium component for the titanium diboride powder are titanium carbide, titanium oxide, titanium and the like. Examples of raw materials suitable for producing the boron component for the boron nitride powder are $B_4C$, $B_2O_3$, boron and the like. The carbon component of the raw materials required for the production of titanium diboride could be any suitable carbon material such as Thermax, which is a finely divided carbon obtained by thermal decomposition or cracking of natural gas. Thermax is a trademark of R. T. Vanderbilt Co. All that is required of the raw materials is that they be present in sufficient amounts to react and make titanium diboride.

Examples of raw materials suitable for producing the boron component for the boron nitride powder are $H_3BO_3$, $B_2O_3$, ammonium borate or any other boric acid-containing materials. Examples of raw materials suitable for producing the nitrogen component of the boron nitride powder are melamine ($C_3N_6H_6$), urea ($NH_4.CO.NH_2$), dicyandiamide ($NH_2.C(NH).NH.CONH_2$), guanidine [$(NH_2)_2 C(NH)$], organic salts of melamine, $NH_3$ gas, cyanamide ($NH.C.NH$), cyanamide compounds and the like. All that is required of the raw materials are that they are present in sufficient amounts to react and make boron nitride.

In the preferred embodiment stoichiometric amounts of the raw materials required to produce $TiB_2$ and BN powders would be blended together, pelletized under pressure to form cohesive bodies and then synthesized by heating at an elevated temperature in a suitable environment. The preferred raw materials for making the titanium diboride would be $TiO_2$, $B_2O_3$ and Thermax and the preferred raw materials for making boron nitride would be $B_2O_3$ and $C_3H_6N_6$. During the synthesis step, the $B_2O_3$ and melamine ($C_3H_6N_6$) would react at about 300° C. to form melamine borate. Above 300° C. up to about 1050° C. unstable BN powder would be formed along with CO, $CO_2$, $NH_3$, $H_2O$, etc. which could then be given off as gases. As the reaction temperature is increased up to 1600° C., the BN would be stabilized through controlled crystal growth; some of the excess $B_2O_2$ would be vaporized; and the lattice $O_2$ content of the BN would be fixed at generally less than 3%. In the same temperature range, 1050° C. to 1600° C., $TiO_2$ would react with Thermax and some of the $B_2O_3$ (at about 1300° C.) to form TiC and CO gas. As the synthesis temperature approaches 1400° C., the TiC would further react with more $B_2O_3$ and Thermax to form $TiB_2$ and more CO gas. After a residence time of ½ to 2 hours at 1600° C., both the BN and $TiB_2$ reaction processes would be complete.

Since the $B_2O_3$-melamine reaction to produce BN powder is realistically never complete, some amount of $B_2O_3$ remains in the synthesized $TiB_2$-BN powder. This oxide can be removed or washed out by dissolving the synthesized powders in an acid or alcohol solution followed by filtering and drying. To expedite the drying process, the powders could be heating to an elevated temperature such as 200° C. After drying, the $TiB_2$-BN powder could be pulverized and prepressed into cohesive bodies and then hot-pressed to form TiB$_2$-BN billets. The billets produced would generally have a theoretical density of 93% and above, preferably 97% and above. The hot pressing steps could be carried out at a pressure of 2000 psi or above, preferably up to 2300 psi, and at a temperature of 1875° C. or above, preferably up to 1900° C.

If the synthesis process is carried out the same way each time, the amount of excess B$_2$O$_3$ present in the TiB$_2$-BN powder should be the same for each batch. This excess B$_2$O$_3$ could then be used as part of the stoichiometric amount of B$_2$O$_3$ needed to produce the TiB$_2$ part of the pre-alloyed powder. As a result, no wash treatment would be required.

The synthesis temperature of the process will depend on the raw materials used in the process. Specifically, it should be heated to a temperature at which the BN and TiB$_2$ reaction processes are substantially complete. For the specific raw materials used in the preferred embodiment above, the raw materials should preferably be heated to about 1600° C. at a rate of between 100° C. to 500° C. per hour, preferably from 250° C. per hour to 350° C. per hour to allow all the intermediate reactions to occur. In the preferred embodiment, the reaction of TiO$_2$+B$_2$O$_3$+C. to form TiB$_2$ and the reaction of melamine+B$_2$O$_3$ to form BN can be carried out at the same time by combining the raw materials for both reactions and synthesizing at about 1600° C. for a sufficient time period to ensure that the BN and TiB$_2$ reaction processes are substantially completed. The BN reaction is essentially complete before the TiB$_2$ reaction starts. As a result, the two processes do not effectively interfere with each other and can, therefore, be carried out during a common heat cycle.

EXAMPLE 1

Stoichiometric amounts of the raw materials shown in Table 1 were used to produce four TiB$_2$-BN powders identified in Table 1 as Samples A, B, C and D. Each sample was placed in a furnace and synthesized by heating to 1600° C. under argon at a rate of heating of 300° C. per hour. Upon reaching 1600° C., the materials were held at this temperature for one hour. During the synthesis process, the B$_2$O$_3$ and melamine (C$_3$N$_6$H$_6$) reacted at about 300° C. to form melamine borate. Above 300° C. up to 1050° C. unstable BN powder was formed and CO, CO$_2$, NH$_3$, H$_2$O, etc. were given off as gases. As the reaction temperature was increased up to 1600° C., the BN was stabilized through controlled crystal growth; some of the excess B$_2$O$_3$ was vaporized; and the lattice O$_2$ content of the BN was fixed at less than 3%. In the same temperature range, 1050° to 1600° C., TiO$_2$ reacted with Thermax and some of the B$_2$O$_3$ ($\sim$1300° C.) to form TiC and CO gas. As the synthesis temperature approached 1400° C., the TiC further reacted with more B$_2$O$_3$ and Thermax to form TiB$_2$ and more CO gas. After a residence time of approximately one hour at 1600° C., both the BN and TiB$_2$ reaction processes were complete.

The weight of the materials put into the furnace and the weight of the material removed from the furnace were measured and the data are shown in Table 1. The synthesized powders were then washed in methanol and dried at 100° C. for 2 hours. This effectively removed excess B$_2$O$_3$ from the synthesized powders. The filtered (washed) synthesized powders were then weighed and the data are shown in Table 1. The average yield of Samples A and B, and average yield of Samples C and D are also shown in Table 1.

The composition of the BN and TiB$_2$ powders were calculated by induction couple plasma emission spectroscopy. The results are shown in Table 1. The synthesized powders of combined Samples A and B and the synthesized powders of combined Samples C and D were hot-pressed at a temperature of 1900° C. under a pressure of 2300 psi for a time period of one and a half hours. The theoretical density of each billet was then determined and the results are shown in Table 1.

As evidenced from the data shown in Table 1, the single process procedure of this invention can produce BN-TiB$_2$ powders that can be hot-pressed into billets which can be further machined to produce containers for vacuum metallizing metals, such as aluminum.

TABLE 1

| | | Sample A | Sample B | Sample C | Sample D |
|---|---|---|---|---|---|
| Raw Materials | w/o | | | | |
| TiO$_2$ | 38.13 | 149.99 gms | 148.61 gms | 149.0 gms | 148.84 gms |
| B$_2$O$_3$ | 33.23 | (33.58% | (33.58%) | (31.78%) | (31.78%) |
| Thermax | 28.64 | by weight) | | | |
| Melamine | 58.79 | 296.66 gms | 293.94 gms | 319.85 gms | 319.51 gms |
| B$_2$O$_3$ | 41.21 | (66.42% | (66.42%) | (68.22%) | (68.22%) |
| | | by weight) | | | |
| Synthesis Process | | | | | |
| Weight Into Furnace (1600° C.) | | 446.65 gms | 442.55 gms | 468.85 gms | 468.35 gms |
| Weight Out | | 136.12 gms | 134.55 gms | 142.97 gms | 142.74 gms |
| Percent Yield from Starting Composition | | 30.48 | 30.40 | 30.49 | 30.48 |
| Methanol Wash | | | | | |
| Weight Into Wash Station | | 136.12 gms | 134.55 gms | 142.97 gms | 142.74 gms |
| Weight Out | | 102.61 gms | 95.55 gms | 97.90 gms | 102.96 gms |
| Percent Yield from Starting Composition | | 22.97 | 21.68 | 20.88 | 21.98 |
| Average Yield, Percent | | 22.33 | | 21.43 | |
| Calculated Composition, w/o: | | | | | |
| TiB$_2$ | | 51.56 | | 50.56 | |
| BN | | 48.44 | | 49.44 | |
| Hot-Pressed Density, % Th. 1900° C.-2300 psi | | 97.0 | | 95.7 | |

EXAMPLE 2

Two different amounts of raw materials as shown in Table 2 were used to produce TiB$_2$-BN powders using the process described in Example 1. Sample E contained a stoichiometric amount of the raw materials while Sample F contained a reduced amount of the $B_2O_3$. Sample E produced slightly more $TiB_2$ powder than Sample F and slightly less BN powder than Sample F. The percent of theoretical density of each sample was substantially equal. The results shown in Table 2 demonstrate that most of the excess boric oxide that occurs when BN powders are produced can be used as part of the stoichiometric amount of boric oxide needed to produce the $TiB_2$ powder of the alloy.

Although specific embodiments of this invention have been described in detail, it should be understood that various modifications may be made without departing from the spirit of this invention.

TABLE 2

|  | Sample E | Wt. % in Blend | Sample F | Wt. % in Blend |
|---|---|---|---|---|
|  | STOICHIOMETRIC | | REDUCED $B_2O_3$ | |
|  | (wt %) | (wt %) | (wt %) | (wt %) |
| Raw Material | | | | |
| $TiO_2$ | 38.12 | | 38.12 | |
| $B_2O_3$ | 33.23 | 31.78 | 33.23 | 33.23 |
| Thermax | 28.64 | | 28.64 | |
| Melamine | 58.79 | 68.22 | 69.01 | 66.77 |
| $B_2O_3$ | 41.21 | | 30.99 | |
| Synthesized | | | | |
| $TiB_2$ — BN Powder Yield as percent of Starting Material | | 30.49% | | 24.24% |
| Methanol Washed Powers Percent Loss based on weight of Synthesized Powders | | 31.5% | | 7.42% |
| Synthesis Process Yield of $TiB_2$ + BN Powder After Wash Process | | 20.88% | | 22.44% |
| Calculated Compositon w/o | | | | |
| $TiB_2$ | | 50.56 | | 49.27 |
| BN | | 49.44 | | 50.73 |
| Hot-Pressed Density % Th. 1900° C. PSI - 2300 | | 95.6 | | 95.8 |

What is claimed is:

1. A process for the simultaneous production of a mixture of titanium diboride powders and boron nitride powders comprising the steps:
   a) mixing together at least one titanium-containing compound, at least one boron-containing compound, particulate carbon and at least one nitrogen-containing compound in an amount sufficient to produce titanium diboride and boron nitride powders;
   b) heating the mixture of step a) to an elevated temperature of at least 1400° C. for a time period sufficient to produce a synthesized titanium diboride and boron nitride mixture;
   c) washing the synthesized titanium diboride and boron nitride mixture of step b) in a solution followed by filtering to remove any excess $B_2O_3$ and then drying the residue; and
   d) pulverizing the residue of step c) to produce a powdered mixture of titanium diboride and boron nitride.

2. The process of claim 1 wherein step e) is added as follows:
   e) hot-pressing the synthesized titanium diboride and boron nitride powders from step d) to form titanium diboride-boron nitride compacted billets.

3. The process of claim 1 wherein in step a) the at least one titanium-containing compound is selected from the group consisting of titanium carbide, titanium oxide, and titanium; the at least one boron-containing compound is selected from the group consisting of $B_4C$, $B_2O_3$, and boron; and the at least one nitrogen-containing compound is selected from the group consisting of melamine, urea, dicyandiamide, guanidine, organic salts of melamine, $NH_3$ gas, cyanamide, and cyanamide compounds.

4. The process of claim 1 wherein in step a) the titanium-containing compound is $TiO_2$; the boron-containing compound is $B_2O_3$; and the nitrogen-containing compound is melamine.

5. The process of claim 4 wherein in step b) the mixture is heated to about 1600° C. and held at this temperature for a period of time sufficient to substantially complete the reactions to form BN and $TiB_2$ powders.

6. The process of claim 4 wherein in step b) the temperature in increased at a rate from 100° C. to 500° C. per hour to about 1600° C.

7. The process of claim 6 wherein in step c) the synthesized titanium diboride and boron nitride powders are washed in an acid solution.

8. The process of claim 7 wherein step e) is added as follows:
   e) hot-pressing the synthesized titanium diboride and boron nitride powders from step d) at an elevated temperature up to about 1900° C. and under a pressure of up to about 2300 psi to form titanium diboride-boron nitride compacted billets.

9. The process of claim 8 wherein the percent of theoretical density of the compacted billet is at least 93%.

10. The process of claim 9 wherein the percent of theoretical density of the compacted billet is at least 97%.

11. The process of claim 4 wherein in step c) the synthesized titanium diboride and boron nitride powders are washed in an acid or alcohol solution.

12. The process of claim 11 wherein in step c) the solution is methanol.

13. The process of claim 11 wherein in step b) the mixture is heated to about 1600° C. and held at this temperature for a period of time from ½ to 2 hours.

14. The process of claim 4 wherein the amount of $TiO_2$, $B_2O_3$, C and melamine is a stoichiometric amount to produce titanium diboride and boron nitride powders.

* * * * *